Dec. 18, 1956  A. E. SANDERS  2,774,608
GOLF CLUB CART
Filed Nov. 23, 1953
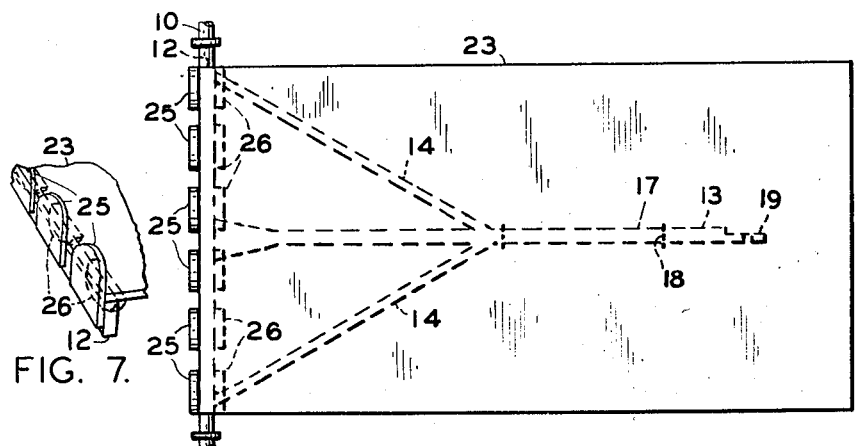
FIGURE 1.
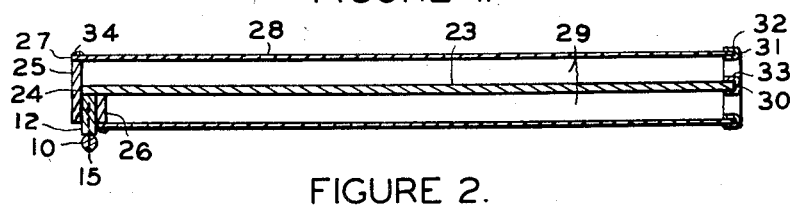
FIGURE 2.
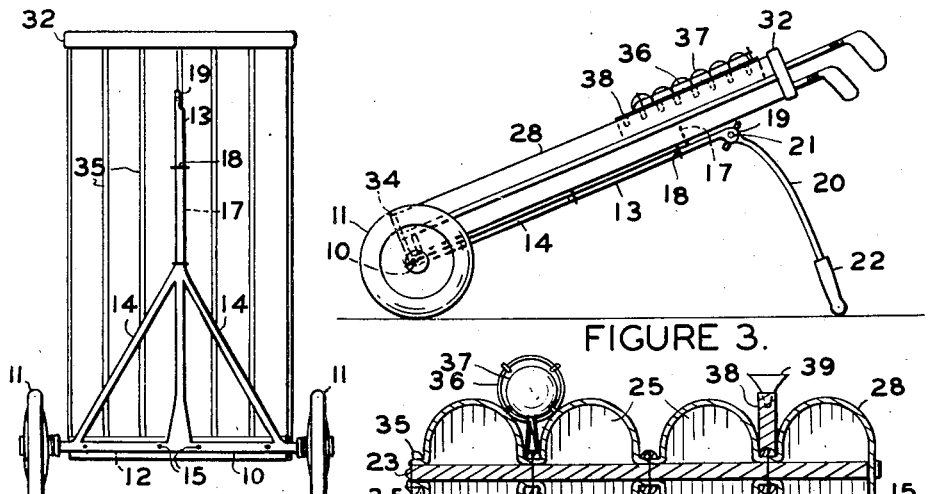
FIGURE 4.
FIGURE 5.
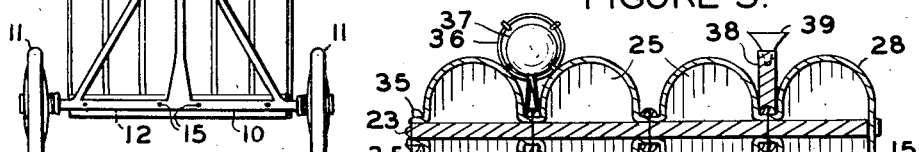
INVENTOR.
ARCHIE EARL SANDERS.
BY *Marvin B. Davis*
ATTORNEY.

United States Patent Office

2,774,608
Patented Dec. 18, 1956

2,774,608
GOLF CLUB CART
Archie Earl Sanders, Kansas City, Mo.

Application November 23, 1953, Serial No. 393,689

2 Claims. (Cl. 280—47.19)

This invention relates to an improvement in a golf club cart and more particularly to the inexpensive structure thereof.

Heretofore a number of golf club carts have been made with various type structures, some of which are made with metal and cause a rattle and chafing of the clubs, some with the irons in pockets near the bottom of the cart where they are not easily or quickly identified, and some too heavy to conveniently carry when necessary where the wheeling of the cart is impossible.

An object of the present invention is to provide an improved light weight golf club cart for wheeling over favorable terrain and carrying when necessary, having an axle with wheels spaced apart and a tongue for manually pushing and pulling, the cart being capable of carrying a plurality of golf clubs preferably a dozen and comprising; a rectangular shaped member, a flexible cover, the flexible cover substantially covering both sides of the rectangular shaped member, the flexible cover being arched or bulged in a plurality of places on each side of the rectangular shaped member to form parallel pockets spaced apart to hold golf clubs, a plurality of strip members, each of the strip members being between a pair of bulges, each of the strip members securing the flexible cover to the rectangular shaped member, closure members, said closure members being attached to said flexible cover and closing one end of the arches or bulges in the flexible cover to complete the pockets therein, and means to secure the rectangular shaped member to the tongue of the golf club cart.

With these objects in view the invention will be more fully understood from the accompanying drawing, the following description and the scope of the claims appended.

In the drawing:

Figure 1 is a front view of the rectangular shaped member for the golf club cart with the end closure members attached to one edge thereof, and the rear end closure members, tongue and axle members being dotted below the rectangular shaped member.

Figure 2 is a longitudinal fragmentary view with parts being broken away to illustrate a longitudinal pocket being on each side of the rectangular shaped member formed by the canvas cover and end closure members. The opposite end of the pockets from the end closure members are illustrated opened for the insertion of golf clubs.

Figure 3 is a side view in elevation of the improved golf club cart with the tongue handle being adjusted for resting the cart in an inclined position, the end of the hand grip member resting on the ground for support. The handle may be folded against the cart for storage or transportation on another vehicle.

Figure 4 is an elevation of the back of the golf club cart, the cart being raised in a vertical position and the fulcrumed handle being removed for simplicity of illustration.

Figure 5 is a view of Figure 4 illustrating only the top end view of the canvas cover to form pockets on each side of the rectangular shaped member.

Figure 6 is an enlarged fragmentary view of a portion of the canvas cover forming pockets on each side of the rectangular shaped member, the longitudinal strips being illustrated between the pockets for attachment to the rectangular shaped member, the tongue being spaced from the rectangular shaped member by a beam, a beam, a golf ball cage being on the opposite side of the canvas cover, and a member for supporting tees.

Figure 7 is a perspective view illustrating a fragmentary corner of the rectangular shaped member with some of the end closure members attached to the edge thereof.

The golf club cart chassis is composed of axle 10, spaced wheels 11, wooden beam 12, tongue 13 with bracing 14, and wooden beam 17. The beam 17 is longitudinal with the tongue 13 and the wooden beam 12 is transverse to longitudinal beam 17 and has the central portion thereof connected thereto. The tongue 13 is attached to the wooden beam 17 by clamp bolts 18. The axle 10 is attached to wooden beam 12 by nails 15, and the eye shaped end 19 of tongue 13 is provided for a handle 20 fulcrumed thereto and held by clamp bolt 21 for adjustment. A hand grip member 22 is fitted on the end of the handle 20.

A longitudinal rectangular shaped member 23 is made of a non-metallic light weight material such as multi-ply board, pressed board or any of the synthetic materials and has one edge 24 provided with a plurality of closure members 25. These closure members 25 are formed of light weight material such as ply board, pressed wood or synthetic material, and have the front edge curved to hold one edge 27 of the front portion of the canvas or flexible cover 28 in arched or bulged shapes forming pockets 29. The pockets 29 extend to the opposite end 30 of the rectangular shaped member 23 and have the canvas edge 31 bound with a binding strip 32 preferably of leather. To complete the entrance to the pockets 29 a finish or binding strip 33 is attached to the end 30 of the rectangular shaped member 23. A binding strip 34 is attached to the edge 27 of closure members 25. All attachments are made by cement, nails, screws or bolts or any combination or substitution of them which are well known in the art.

The closure members 26 are preferably semi-circular in shape, have the chord portions thereof attached to the rectangular shaped member 23, the flat portion thereof attached to the wooden beam 12. The rear portion of the canvas or flexible cover 28 has the lower edge thereof attached to the rear edges of the closure members 26 to hold the canvas in arched shape to form the pockets 29. The front pockets 29 are the same as the rear pockets 29 with the exception that the canvas is slightly shorter in the length of the pockets due to the thickness of beam 12 and closure members 25.

Strip members 35 are approximately the length of the rectangular shaped member 23 and are placed between the pockets 29 to attach the canvas or flexible cover 28 to the rectangular shaped member from the binding strip 32 to the binding strip 34. The strip members 35 are on the front and rear of the golf club cart with the exception of the rear center which is attached to the longitudinal beam 17 of the chassis.

A golf ball wire cage 36 is attached to the front of the golf club cart for balls 37 and a strip 38 is mounted on the front of the cart for holding a number of golf tee members 39.

It is obvious that a person may put a golf stick in each pocket with the irons extended outside of the pockets, reach for the handle grip member 22, raise it upward to a comfortable holding level and wheel the cart where desired. A golf club caddy may easily place his hands on the golf club cart, lift it when fully loaded with golf clubs and carry it when necessary.

From Figure 3 it is further obvious that the golf club pockets 29 are inclined upward from the axle 10 to the open end with leather binding 32 and held at this angle of inclination by handle 20. This resting position of the cart elevates the golf clubs to a normal angle of inclination to be easily withdrawn without any undue effort. The selection of clubs and withdrawal or replacement thereof is accomplished without touching the cart.

What I claim as new and desire to secure by Letters Patent is:

1. An improved club cart comprising: an axle, a pair of wheels, said pair of wheels spaced on said axle, a tongue, said tongue having one end thereof attached at a right angle to the mid-length of said axle, a beam, said beam being parallel with and secured on said axle, a second beam, said second beam being parallel with and secured on said tongue, a flat member, said flat member being of a rectangular shape having a width substantially equal to the length of the first mentioned beam, said flat member being secured flatwise on the beams with one edge thereof flush with the side of the beam opposite the tongue connection thereto, closure members, said closure members being secured flatwise against the side of the first mentioned beam on the axle and the mentioned one edge of the flat member, said closure members being projected above the flat member, said closure members being curved above the flat member, said closure members being equally spaced on the first mentioned beam, a second plurality of closure members, each of said second plurality of closure members having a curved edge and a straight edge, the straight edge of said second closure members being secured against the bottom of the flat member, one side of each of said second closure members being secured against the opposite side of the first mentioned beam on the axle, canvas, strip members, said canvas forming a plurality of parallel pockets by being attached between the pockets to said flat member with said strip members, and the lower ends of the canvas being attached to the curved portions of said first and second mentioned closure members.

2. An improved club cart comprising: an axle, a pair of wheels, said pair of wheels spaced on said axle, a tongue, said tongue having one end thereof attached at a right angle to the mid-length of said axle, a beam, said beam being parallel with and secured on said axle, a second beam, said second beam being parallel with and secured on said tongue, a flat member, said flat member being of a rectangular shape having a width substantially equal to the length of the first mentioned beam, said flat member being secured flatwise on the beams with one edge thereof flush with the side of the beam opposite the tongue connection thereto, closure members, said closure members being secured flatwise against the side of the first mentioned beam on the axle and the mentioned one edge of the flat member, said closure members being projected above the flat member, said closure members being curved above the flat member, said closure members being equally spaced on the first mentioned beam, canvas, strip members, said canvas forming a plurality of parallel pockets by being attached between the pockets to said flat member with said strip members, and the lower ends of the canvas being attached to the curved portions of said mentioned closure members.

References Cited in the file of this patent

UNITED STATES PATENTS

| 2,262,298 | Proctor | Nov. 11, 1941 |
| 2,368,752 | Duis | Feb. 6, 1945 |
| 2,513,055 | Samuelson | June 27, 1950 |
| 2,520,226 | Smith | Aug. 29, 1950 |
| 2,570,504 | Van House | Oct. 9, 1951 |
| 2,571,392 | Stringer | Oct. 16, 1951 |